(12) United States Patent
Davis et al.

(10) Patent No.: US 12,388,806 B2
(45) Date of Patent: Aug. 12, 2025

(54) ENTERPRISE GOVERNANCE INVENTORY AND AUTOMATION TOOL

(71) Applicant: HARTFORD FIRE INSURANCE COMPANY, Hartford, CT (US)

(72) Inventors: Clinton G. Davis, Winter Garden, FL (US); Jocelyn Amy DeMaio, Glastonbury, CT (US); Julie Ann Reed, Coventry, CT (US); Robert C. Rising, Manchester, CT (US); Sean O. Skinner, Colleyville, TX (US); Sona O. Sliker, Charleston, SC (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 343 days.

(21) Appl. No.: 17/715,691

(22) Filed: Apr. 7, 2022

(65) Prior Publication Data

US 2023/0328049 A1    Oct. 12, 2023

(51) Int. Cl.
    *H04L 9/40*    (2022.01)
(52) U.S. Cl.
    CPC .............. *H04L 63/08* (2013.01); *H04L 63/20* (2013.01)
(58) Field of Classification Search
    CPC ................................. H04L 63/08; H04L 63/20
    USPC .......................................................... 726/7
    See application file for complete search history.

(56) References Cited

U.S. PATENT DOCUMENTS

| | | | |
|---|---|---|---|
| 10,104,125 B2 | 10/2018 | Lim | |
| 10,459,757 B1 * | 10/2019 | Srinivasan | ............ G06F 9/5072 |
| 10,789,387 B2 | 9/2020 | Mutha et al. | |
| 11,483,327 B2 * | 10/2022 | Hen | ...................... G06F 21/6218 |
| 11,575,512 B2 * | 2/2023 | King | ........................ H04L 63/10 |
| 11,575,692 B2 * | 2/2023 | Romero Zambrano | . G06N 5/04 |
| 11,632,360 B1 * | 4/2023 | Tan | ......................... G06F 3/0622 726/4 |
| 11,765,152 B2 * | 9/2023 | Obando Chacon | ......................... H04L 63/0815 726/4 |

(Continued)

*Primary Examiner* — Tauqir Hussain
(74) *Attorney, Agent, or Firm* — Buckley, Maschoff & Talwalkar LLC

(57) ABSTRACT

A system may include a directory-based identity-related services component that authenticates and authorizes enterprise users and computers in a network and enforces security policies. A business intelligence, application development, and application connectivity component may implement business workflow products and exchange application authentication data with the directory-based identity-related services component. A database storage component may provide document management and storage of dashboard tables and lists associated with inventory data received from the business intelligence, application development, and application connectivity component. A cloud-based storage and data management engine may exchange secure authentication storage data with the business intelligence, application development, and application connectivity component. At least one governance or user application may then automatically determine enterprise site inventory information, and, responsive to the determined enterprise site inventory information, automatically determine enterprise site membership information. The dashboard tables and lists may be exchanged in support of a graphical user display.

23 Claims, 14 Drawing Sheets

(56) References Cited

U.S. PATENT DOCUMENTS

| | | | |
|---|---|---|---|
| 11,770,398 B1* | 9/2023 | Erlingsson | G06F 16/3329 |
| | | | 709/224 |
| 11,930,017 B1* | 3/2024 | Hadun | H04L 63/102 |
| 2009/0080017 A1* | 3/2009 | Lapstun | G06K 19/06037 |
| | | | 358/1.15 |
| 2017/0256173 A1* | 9/2017 | Burford | G06N 20/00 |
| 2020/0387631 A1 | 12/2020 | Mutha et al. | |
| 2021/0133197 A1* | 5/2021 | Nguyen | H04L 9/3239 |
| 2021/0243231 A1 | 8/2021 | Tannu et al. | |
| 2022/0019693 A1* | 1/2022 | Barday | G06F 15/76 |
| 2022/0237208 A1* | 7/2022 | Srinivasan | G06F 16/26 |
| 2022/0300633 A1* | 9/2022 | LeVasseur | G06F 21/6218 |
| 2022/0351202 A1* | 11/2022 | Ghorbani | G06Q 20/3674 |
| 2023/0170069 A1* | 6/2023 | Groteke | G16H 30/40 |
| | | | 382/128 |
| 2023/0269114 A1* | 8/2023 | Lochhead | H04L 43/08 |
| | | | 370/392 |
| 2023/0269272 A1* | 8/2023 | Dambrot | H04L 63/1408 |
| | | | 726/22 |
| 2023/0308474 A1* | 9/2023 | Thompson | H04L 63/1433 |
| 2023/0319053 A1* | 10/2023 | Hendrey | H04L 63/08 |
| | | | 726/4 |
| 2023/0336592 A1* | 10/2023 | Narayanaswamy | H04L 63/20 |

* cited by examiner

ENTERPRISE GOVERNANCE INVENTORY AND AUTOMATION TOOL

TECHNICAL FIELD

The present application generally relates to computer systems and more particularly to computer systems that are adapted to accurately and/or automatically facilitate enterprise governance inventory and automation.

BACKGROUND

An enterprise, such as a business, may want to facilitate collaborations within and/or between teams and users. In some cases, an enterprise may have thousands of users who each access many different enterprise applications. Increasingly, these types of enterprise tasks and processes are implemented via a productivity cloud, such as MICROSOFT™ 365, that is designed to help provide users with applications, intelligent cloud services, and advanced security.

To manage access to these types of productive clouds, it may be important to have an inventory of available applications (or sites) and users (or members) who have access to each site. For example, sites with many thousands of members may be more difficult to govern in connection with sensitive or confidential data. Other information about sites might include who owns each site, what groups are associated with each site, etc. Manually collecting this type of inventory information or metadata can be a time consuming and error-prone task, especially when a large number of sites (e.g., thousands of sites) and/or members (e.g., tens of thousands members) are involved. Similar information may be helpful to implement automated processes for the enterprise. Currently, there is no appropriate solution to collect this type of information for a family of client software, server software, and service products.

It would be desirable to provide improved systems and methods to accurately and/or automatically facilitate enterprise governance inventory and automation processes via a family of client software, server software, and services. Moreover, the information should be easy to access, understand, update, etc.

SUMMARY OF THE INVENTION

According to some embodiments, systems, methods, apparatus, computer program code and means are provided to accurately and/or automatically facilitate enterprise governance inventory and automation processes via a family of client software, server software, and services in a way that provides fast and useful results and that allows for flexibility and effectiveness when responding to the information.

A system may include a directory-based identity-related services component that authenticates and authorizes enterprise users and computers in a network and enforces security policies. A business intelligence, application development, and application connectivity component may implement business workflow products and exchange application authentication data with the directory-based identity-related services component. A database storage component may provide document management and storage of dashboard tables and lists associated with inventory data receive from the business intelligence, application development, and application connectivity component. A cloud-based storage and data management engine may exchange secure authentication storage data with the business intelligence, application development, and application connectivity component. At least one governance or user application, may then automatically determine enterprise site inventory information, and, responsive to the determined enterprise site inventory information, automatically determine enterprise site membership information. The dashboard table and lists may be exchanged in support of a graphical user display.

Some embodiments comprise: means for authenticating and authorizing enterprise users and computers in a network; means for assigning and enforcing security policies; means for implementing application development, and application connectivity component, business workflow products; means for exchanging application authentication data with a directory-based identity-related services component; means for providing document management and storage of dashboard tables and lists; means for exchanging data with a business intelligence, application development, and application connectivity component; means for exchanging secure authentication storage data with the business intelligence, application development, and application connectivity component; means for automatically determining enterprise site inventory information; responsive to the determined enterprise site inventory information, means for automatically determining enterprise site membership information; and means for exchanging the dashboard tables and lists with a database storage component via a communication port in support of a graphical user display, including the enterprise site inventory and membership information, via a distributed communication network.

In some embodiments, a communication device associated with an enterprise platform exchanges information with remote devices in connection with an interactive graphical user interface. The information may be exchanged, for example, via public and/or proprietary communication networks.

A technical effect of some embodiments of the invention is an improved and computerized way to accurately and/or automatically facilitate enterprise governance inventory and automation processes via a family of client software, server software, and services in a way that provides fast and useful metadata. With these and other advantages and features that will become hereinafter apparent, a more complete understanding of the nature of the invention can be obtained by referring to the following detailed description and to the drawings appended hereto.

DETAILED DESCRIPTION

Figure 1:
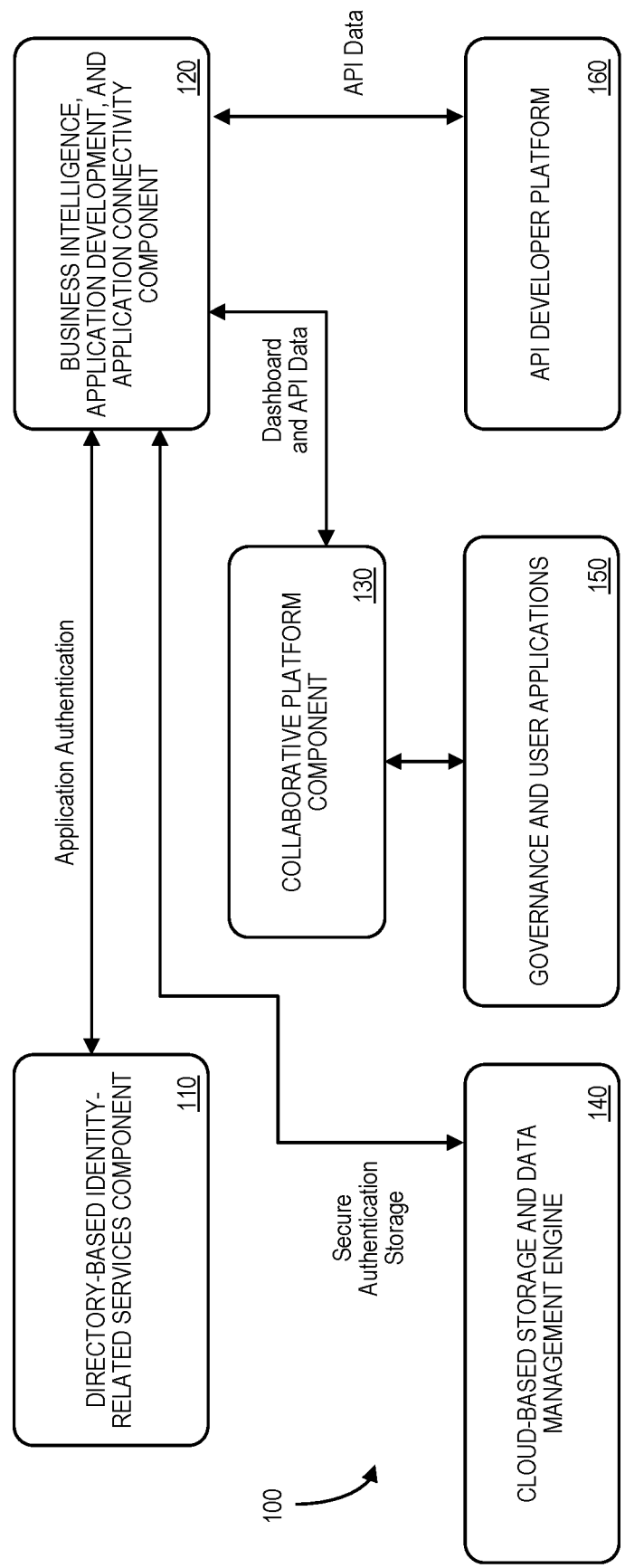
FIG. 1 is a high-level block diagram of an enterprise governance inventory and automation tool in accordance with some embodiments.

Before the various exemplary embodiments are described in further detail, it is to be understood that the present invention is not limited to the particular embodiments described. It is also to be understood that the terminology used herein is for the purpose of describing particular embodiments only and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention provides significant technical improvements to facilitate implementation of an enterprise governance inventory and automation tool. The present invention is directed to more than merely a computer implementation of a routine or conventional activity previously known in the industry as it provides a specific advancement in the area of electronic record analysis by providing improvements in the operation of a computer system that teams can more easily and efficiently access information about enterprise integration tools (as well as other applications). The present invention provides improvement beyond a mere generic computer implementation as it involves the novel ordered combination of system elements and processes to provide improvements in the ease, security, and speed at which such information may be performed shared. Some embodiments of the present invention are directed to a system adapted to automatically analyze electronic records, aggregate data from multiple sources, distribute inventory information via dashboards, etc. Moreover, communication links and messages may be automatically established, aggregated, formatted, exchanged, etc. to improve network performance (e.g., by reducing an amount of network messaging bandwidth and/or storage required to support secure inventory creation and use).

FIG. 1 is a high-level block diagram of an enterprise governance inventory and automation tool or system 100 according to some embodiments of the present invention. In particular, the system 100 includes a directory-based identity-related services component 110 that may authenticate and authorize enterprise users and computers in a network. The system 100 may further include a business intelligence, application development, and application connectivity component 120 that may implement business workflow products and provide application authentication information to the directory-based identity-related services component 110.

A collaborative platform component 130 may provide document management and storage of dashboard list and Application Programming Interface ("API") data. According to some embodiments, storage may be achieved via a Structured Query Language ("SQL") element, an ORACLE® database, a DATAVERSE® storage solution, etc. A cloud-based storage and data management engine 140 may exchange secure authentication storage data with the business intelligence, application development, and application connectivity component 120. Moreover, a computer processor of at least one governance or user application 150 may automatically determine enterprise site inventory information. Responsive to the determined enterprise site inventory information, the governance or user application 150 may then automatically determine enterprise site membership information. The governance or user application 150 can then transmit the dashboard list data to the collaborative platform component 130 via a communication port in support of a graphical user display (including the enterprise site inventory and membership information) via a distributed communication network. According to some embodiments, system 100 also includes an API developer platform 160 to: connect multiple services and devices, and exchange API data with the business intelligence, application development, and application connectivity component 120.

The system 100 may therefore access information in the collaborative platform component 130 (e.g., storing a set of electronic records associated with a set of enterprise sites, each record including, for example, one or more record identifiers, membership information, site owners, etc.). The system 100 may also store information into other data stores and utilize a runtime environment to view, analyze, and/or update the electronic records. The system 100 may also exchange information with a cloud-based environment (e.g., via a firewall) executing a family of client software, server software, and services. According to some embodiments, an interactive graphical user interface platform of the system 100 (and, in some cases, enterprise data and/or third-party data) may facilitate forecasts, decisions, predictions, and/or the display of communications via one or more remote administrator computers (e.g., to identify appropriate updates to inventory rules and logic). Note that the system 100 and/or any of the other devices and methods described herein might be associated with a third party, such as a vendor that performs a service for an enterprise.

The system 100 and/or the other elements of the system 100 might be, for example, associated with a Personal Computer ("PC"), laptop computer, smartphone, an enterprise server, a server farm, and/or a database or similar storage devices. According to some embodiments, an "automated" system 100 may facilitate automated generation of site inventory information. As used herein, the term "automated" may refer to, for example, actions that can be performed with little (or no) intervention by a human.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The system 100 may store information into and/or retrieve information from the collaborative platform component 130. The collaborative platform component 130 might be locally stored or reside remote from other elements of the system 100. As will be described further below, the collaborative platform component 130 may be used by the system 100 in connection with an interactive user interface to access and update electronic records. Although a single collaborative platform component 130 is shown in FIG. 1, any number of such devices may be included. Moreover, various devices described herein might be combined according to embodiments of the present invention. For example, in some embodiments, the directory-based identity-related services component 110 and the collaborative platform component 130 might be co-located and/or may comprise a single apparatus.

Figure 2:
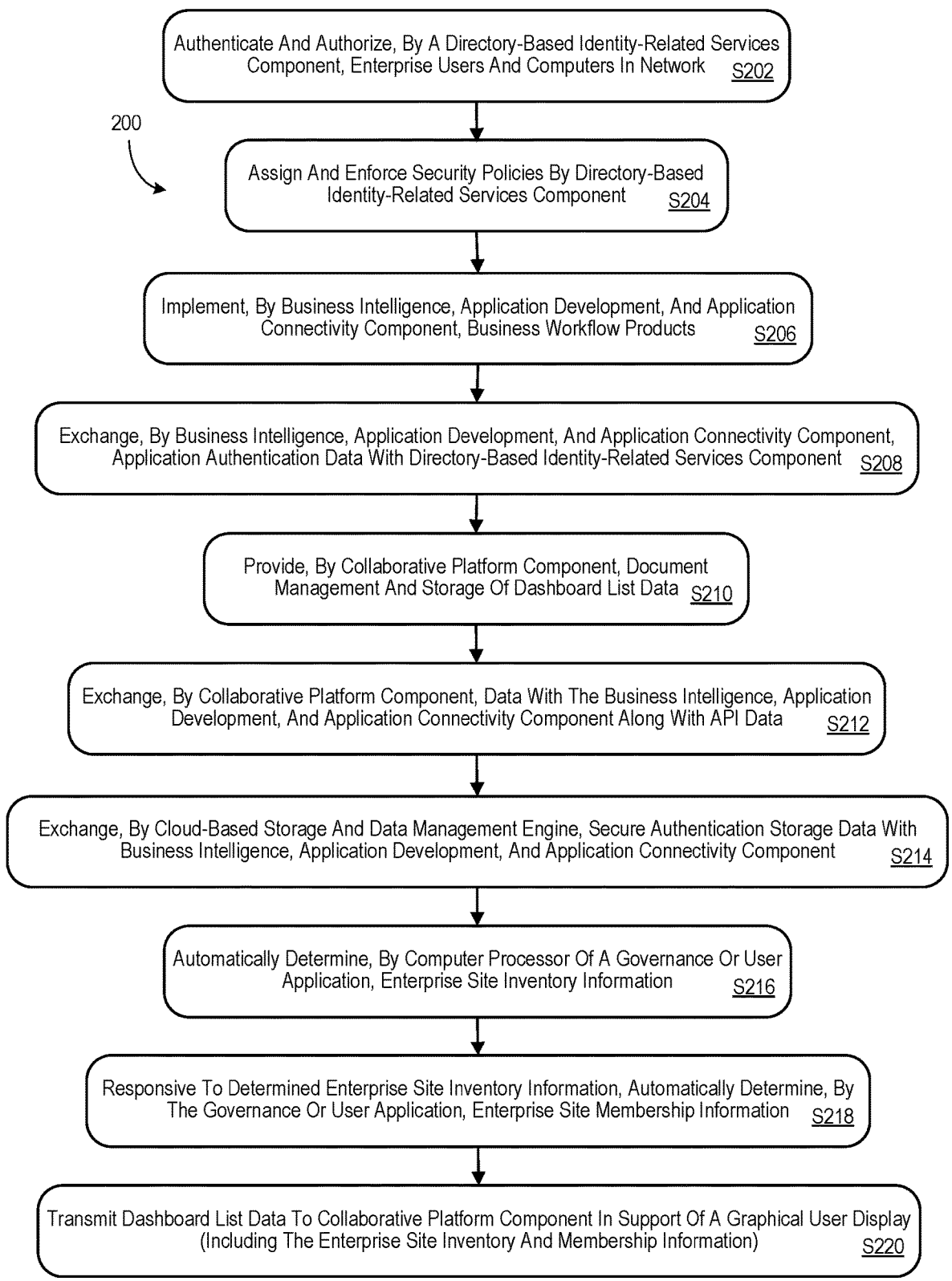
FIG. 2 illustrates an enterprise governance inventory and automation method according to some embodiments of the present invention.

Note that the system 100 of FIG. 1 is provided only as an example, and embodiments may be associated with additional elements or components. According to some embodiments, the elements of the system 100 automatically transmit information associated with an interactive user interface display over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S202, a directory-based identity-related services component may authenticate and authorize enterprise users and computers in a network. At S204, the directory-based identity-related services component may assign and enforce security policies. At S206, a business intelligence, application development, and application connectivity component may implement business workflow products (e.g., an inventory flow, a membership flow, etc.).

At S208, the business intelligence, application development, and application connectivity component may exchange authentication data with the directory-based identity-related services component. At S210, a collaborative platform component may provide document management and storage of dashboard list data (e.g., via an SQL or ORACLE® database, a DATAVERSE® storage solution, etc.). At S212, the collaborative platform component may exchange data with the business intelligence, application development, and application connectivity component along with API data. At S214, a cloud-based storage and data management engine may exchange secure authentication storage data with the business intelligence, application development, and application connectivity component.

At S216, a computer processor of at least one governance or user application may automatically determine enterprise site inventory information (e.g., which sites are operated by the enterprise). Responsive to the determined enterprise site inventory information, at S218 the governance or user application may automatically determine enterprise site membership information (e.g., who can access each site in the inventory).

Figure 3:
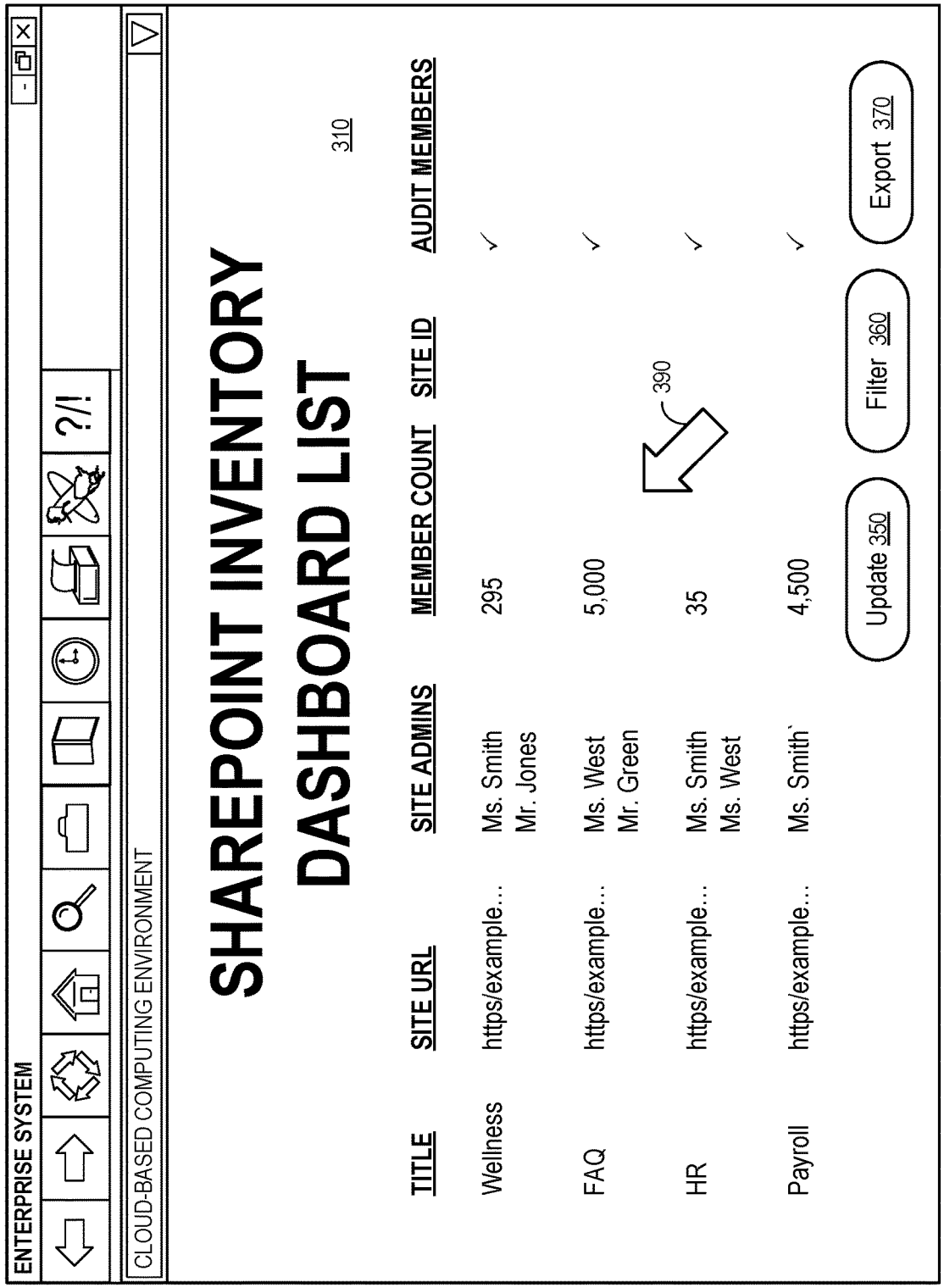
FIG. 3 illustrates an inventory dashboard list in accordance with some embodiments.

At S220, the system may transmit the dashboard list data to the collaborative platform component via a communication port in support of a graphical user display (including the enterprise site inventory and membership information) via a distributed communication network. For example, FIG. 3 illustrates a graphical user display 300 with an inventory dashboard list 310 according to some embodiments. The inventory dashboard list 310 might include, for example, a site title, a site URL, site administrators, a member count, a site identifier, etc. Selection of a portion of the display (e.g., via a touchscreen or computer mouse pointer 390) may provide more detailed information about that element (e.g., contact information for site administrators). Moreover, selection of an "Update" icon 350 may be used to adjust information in the list 310 (e.g., by deleting a site), selection of a "Filter" 360 may sort or otherwise adjust the list 310 (e.g., by only showing sites with more than 1,000 members), and selection of an "Export" icon 370 may save the list 310 information. Note that the embodiment disclosed in FIG. 3 is provided only as an example and other embodiments may incorporate other types of inventory information (e.g., for YAMMER® or TEAMS® inventory lists), automated applications (e.g., associated with a re-certification process), etc.

Figure 4:
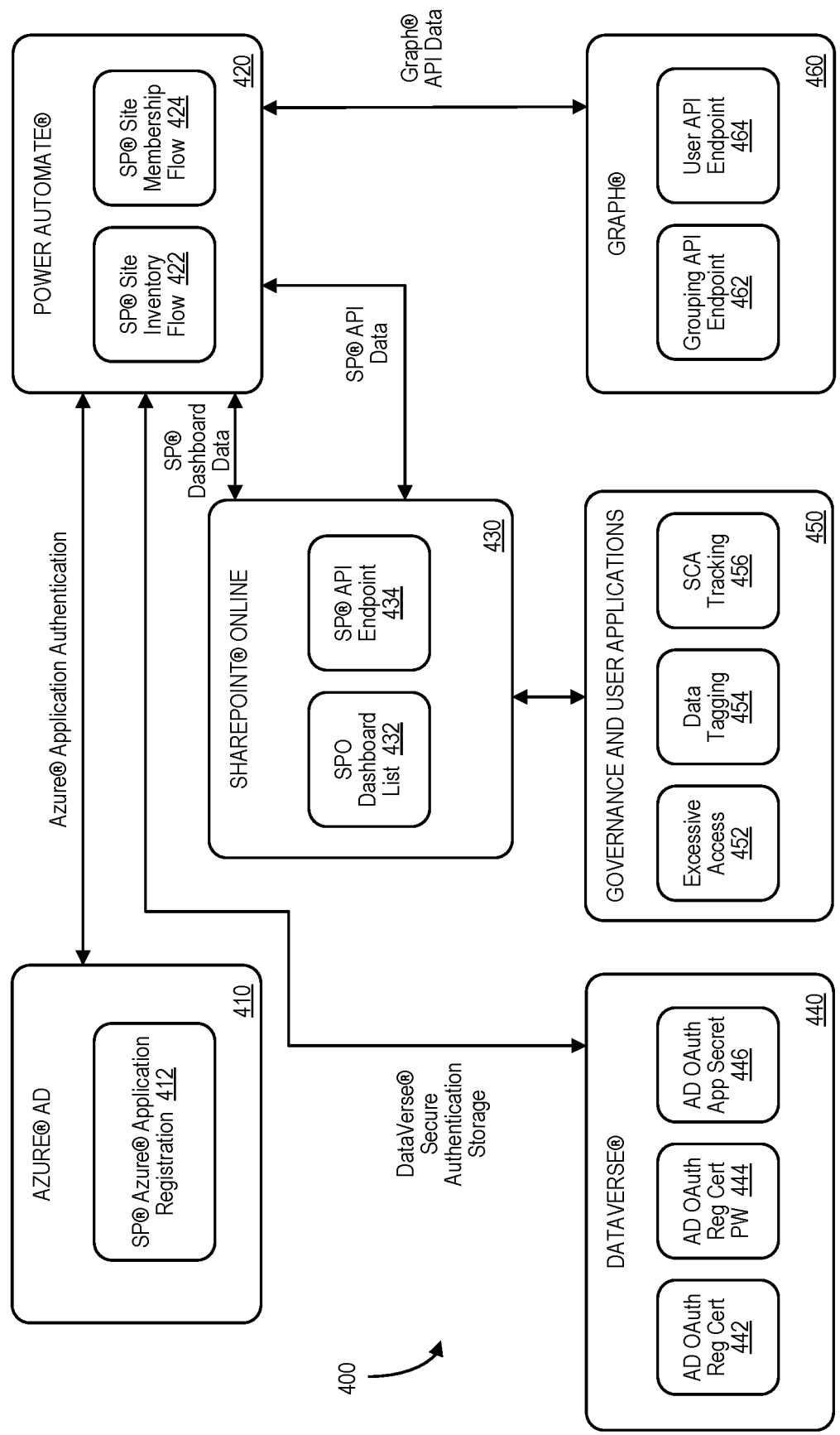
FIG. 4 is a particular example of an enterprise governance inventory and automation tool according to some embodiments.

FIG. 4 is a particular example of an enterprise governance inventory and automation tool or system 400 according to some embodiments. The system 400 includes a MICROSOFT™ AZURE® Active Directory 410 that may authenticate and authorize enterprise users and computers in a network. In general, "Active Directory" is a set of processes and services that provides a range of directory-based identity-related services. An Active Directory may authenticate and authorize users and computers in a network, assign and enforce security policies, install or update software, etc. For example, when a user logs into a computer, the Active Directory may check the submitted username and password and determine whether a user is a system administrator or a "normal" user. Also, it may allow for the management and storage of information, provide authentication and authorization mechanisms, and establish a framework to deploy other related services (e.g., certificate services, active directory federation services, lightweight directory services, rights management services, etc.). The AZURE® Active Directory 410 is a cloud-based identity and access management service. The service helps employees access external resources (e.g., MICROSOFT™ 365, Software-as-a-Service ("SaaS") applications, etc.) and internal resources (e.g., applications on a corporate network and intranet, cloud applications developed by an organization, etc.). The AZURE® Active Directory 410 may, according to some embodiments, provide single sign-on, multifactor authentication, and/or conditional access that may help guard against cybersecurity attacks. In some embodiments, the AZURE® Active Directory 410 further implements SHAREPOINT® AZURE® application registration 412.

The system 400 may further include MICROSOFT™ POWER AUTOMATE® 420 to implement business workflow products and provide application authentication information to the AZURE® Active Directory 410. According to some embodiments, POWER AUTOMATE® 420 is associated with the MICROSOFT™ Power Platform business intelligence, application development, and application connectivity software applications. In particular, POWER AUTOMATE® 420 may comprise a toolkit for implementing business workflow products such as a SHAREPOINT® site inventory flow 422 and/or a SHAREPOINT® site membership flow 424.

MICROSOFT™ SHAREPOINT® Online 430 may provide document management and storage of dashboard list and API data. According to some embodiments, storage may be achieved via a SQL element, an ORACLE® database, a DATAVERSE® storage solution, etc. SHAREPOINT® Online 430 is a web-based collaborative platform that integrates with Microsoft Office that provides document management and storage along with other services and may include, for example, a SHAREPOINT® Online dashboard list 432 and/or SHAREPOINT® API endpoint 434 information.

MICROSOFT™ DATAVERSE® 440 is a cloud-based storage and data management engine (e.g., as a form of data lake) built on MICROSOFT™ AZURE® SQL. According to some embodiments, the DATAVERSE® 440 handles an Active Directory Open Authorization ("OAuth") registration certificate 442. OAuth is an open, standardized protocol for internet token-based authorization. OAuth allows services to manage access to an end user's account information without disclosing the user's credentials. First, an authorization flow is used to authenticate and authorize a third-party service. After that, an access token is generated and shared with the third-party service which allows specific information to be accessed. Passwords do not need to be shared because OAuth lets a user authorize an application to communicate with another. Instead of passing authentication data between customers and service providers, OAuth provides a token. Therefore, developers may access end-user data in a more secure manner. According to some embodiments, the OAuth registration certificate 442 is associated with a Proof Key for Code Exchange (referred to as "PKCE" or "PFX" file) protocol. Moreover, in some embodiments the DATAVERSE® 940 further handles an Active Directory OAuth registration certificate password 444 and/or an Active Directory OAuth registration certificate secret 446. Note that the DATAVERSE® may also exchange secure authentication storage data with POWER AUTOMATE® 420.

Moreover, a computer processor of at least one governance or user application 450 may automatically determine enterprise site inventory information. Responsive to the determined enterprise site inventory information, the governance or user application 450 may then automatically determine enterprise site membership information. According to some embodiments, the governance or user application 450 might be associated with excessive access governance 452, data tagging governance 454, a Site Collection Administrators ("SCA") tracking application 456, etc.

GRAPH® 460 is a MICROSOFT™ API developer platform that connects multiple services and devices. GRAPH® 460 may, for example, let developers integrate their services with other products (such as WINDOWS®, MICROSOFT™ 365, and AZURE®) and provide functionality and connectivity between WINDOWS® and other Operating System ("OS") platforms (e.g., GOOGLE™ ANDROID® and APPLE™ iOS®). According to some embodiments, GRAPH® 460 implements a group API endpoint 462 and/or a user API endpoint 464.

Figure 5:
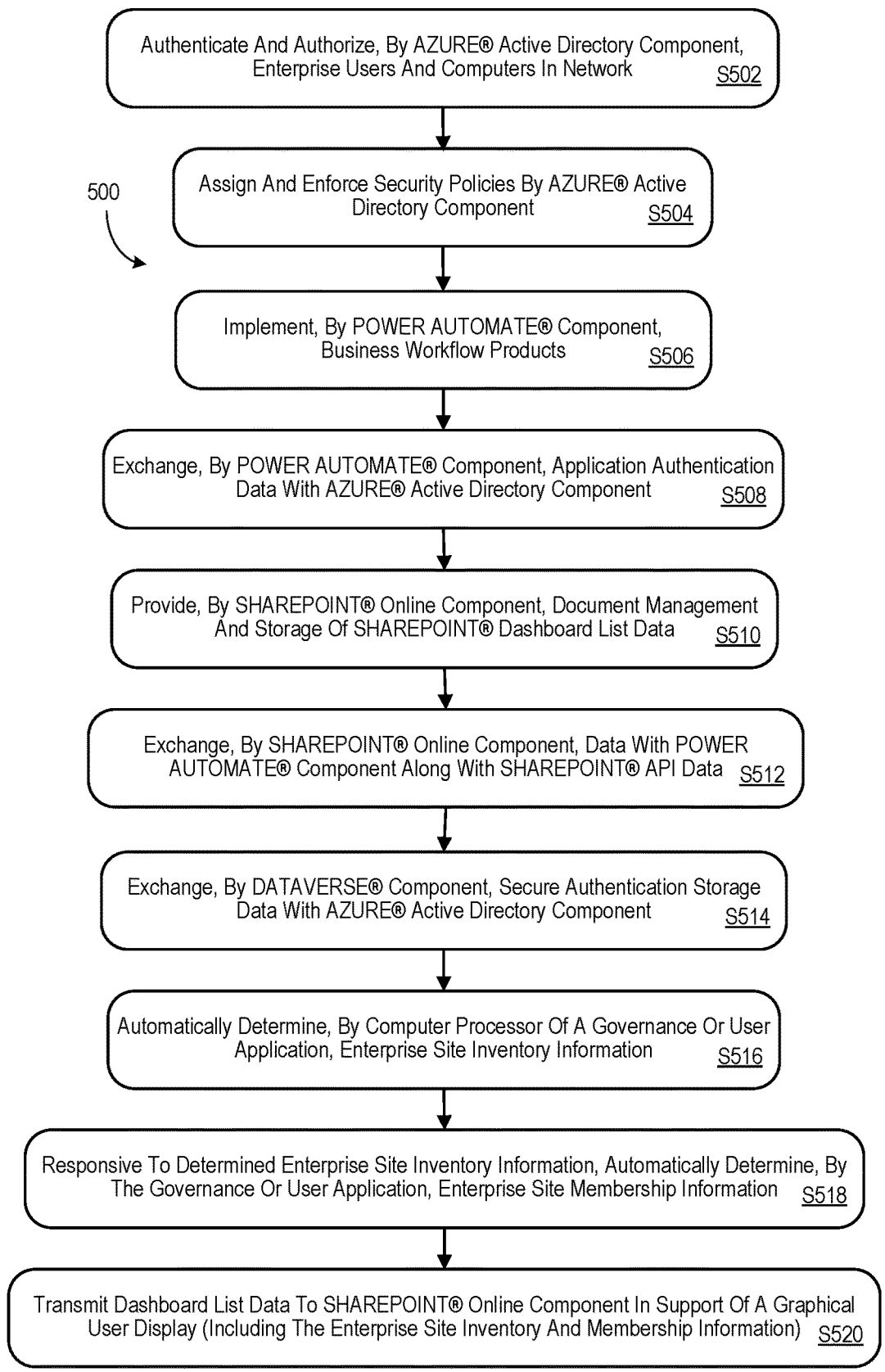
FIG. 5 illustrates a particular example of an enterprise governance inventory and automation method in accordance with some embodiments of the present invention.

FIG. 5 illustrates a particular example of an enterprise governance inventory and automation method 500 in accordance with some embodiments of the present invention. At S502, AZURE® Active directory component may authenticate and authorize enterprise users and computers in a network. At S504, the AZURE® Active Directory component may assign and enforce security policies. At S506, a POWER AUTOMATE® component may implement business workflow products (e.g., an inventory flow, a membership flow, etc.).

At S508, the POWER AUTOMATE® component may exchange AZURE® authentication data with the AZURE® Active Directory component. At S510, a SHAREPOINT® Online component may provide document management and storage of dashboard list data (e.g., via an SQL or ORACLE® database, a DATAVERSE® storage solution, etc.). At S512, the SHAREPOINT® Online component may exchange data with the POWER AUTOMATE® component along with API data. At S514, a DATAVERSE® engine may exchange DATAVERSE® secure authentication storage data with the POWER AUTOMATE® component.

At S516, a computer processor of at least one governance or user application may automatically determine enterprise site inventory information (e.g., which sites are operated by the enterprise). Responsive to the determined enterprise site inventory information, at S518 the governance or user application may automatically determine enterprise site membership information (e.g., who can access each site in the inventory). At S520, the system may transmit the dashboard list data to the SHAREPOINT® Online component via a communication port in support of a graphical user display (including the enterprise site inventory and membership information) via a distributed communication network.

In this way, embodiments may help ensure that the data that is stored within MICROSOFT™ TEAMS® and SHAREPOINT® Online is protected and properly secured. In order to properly develop tools, processes, and functionality for data protection, a master list of very specific SHAREPOINT® metadata may be necessary. According to some embodiments, an inventory list may be used to build multiple POWER AUTOMATE® applications to help an enterprise better secure sensitive and confidential data. The inventory list might be used, for example, in connection with:

site owner education (how to properly secure data),
initial education,
annual education recertification,
site owner recertification,
open access (e.g., sites that can be accessed by over 4,000 users), and/or
site usage recertification.

Embodiments may gather from a SHAREPOINT® Online environment and compile an inventory of:

SHAREPOINT® Online site collection URLs, display names, and unique IDs,
SHAREPOINT® Online sub-sites URLs, display names, and unique IDs,
site collection administrators for each site collection (including a name and email address),
a number of users a site collection or sub-site has been shared with, and/or
whether a site collection or sub-site has been shared with large exposure groups (e.g., "Everyone" and "AllEmployees").

According to some embodiments, the system may initially build a site inventory and then execute a site membership flow. The system may grab the authentication and sites (and perform filtering, such as with blogs), check each employee, and confirm site administrators. According to some embodiments, the system may automatically generate notifications to site administrators, go into groups, and ensure they are the users (and then confirm users, permissions, and active accounts). In some embodiments, the system may check for duplication and de-duplicate as applicable and update metadata (for example, sensitivity labels may work with other inventories).

The two POWER AUTOMATE® flows described herein may use the following API endpoints, permissions, and authentication. These permissions may represent application permissions/not delegated and require administrator consent.

The "Build Site Inventory" POWER AUTOMATE® flow may have the following API endpoint: "https://graph.microsoft.com/v1.0/sites?search=*". The authentication type may comprise: Active Directory, OAuth, client identifier, and/or secret. API permissions may include Graph Sites.Read.All. The API use description might comprise "collects all SPO Site Collection and Site URLs, display names and unique IDs from GRAPH® API."

The "Update Site Membership" POWER AUTOMATE® flow may have the following API endpoint: {SPO SITE URL}/_api/web/siteusers?$select=title". The authentication type may comprise: Active Directory. OAuth, client identifier, and/or certificate PFX. API permissions may include SharePoint Sites.Read.All. The API use description might comprise "collects user name and email address for all users that are permissioned for the provided Site Collection or Site."

The "Update Site Membership" POWER AUTOMATE® flow may have the following API endpoint: {SPO SITE URL}/_api/web/siteusers?$select=IsSiteAdmin,Email". The authentication type may comprise: Active Directory, OAuth, client identifier, and/or certificate PFX. API permissions may include SharePoint Sites.FullControl.All. The API use description might comprise "collects email and username of all users for the provided Site Collection or Site and selects the properties for if they are a SiteAdmin and their Email."

The Update Site Membership" POWER AUTOMATE® flow may have the following API endpoint: "https://graph.microsoft.com/v1.0/groups/?$filter=mail+eq+'{EMAIL ADDRESS}'&$expand=owners". The authentication type may comprise: Active Directory, OAuth, client identifier, and/or secret. API permissions may include Graph Group.Read.All and/or GroupMember.Read.All. The API use description might comprise "collects owners of a group for the provided email address."

Figure 6:
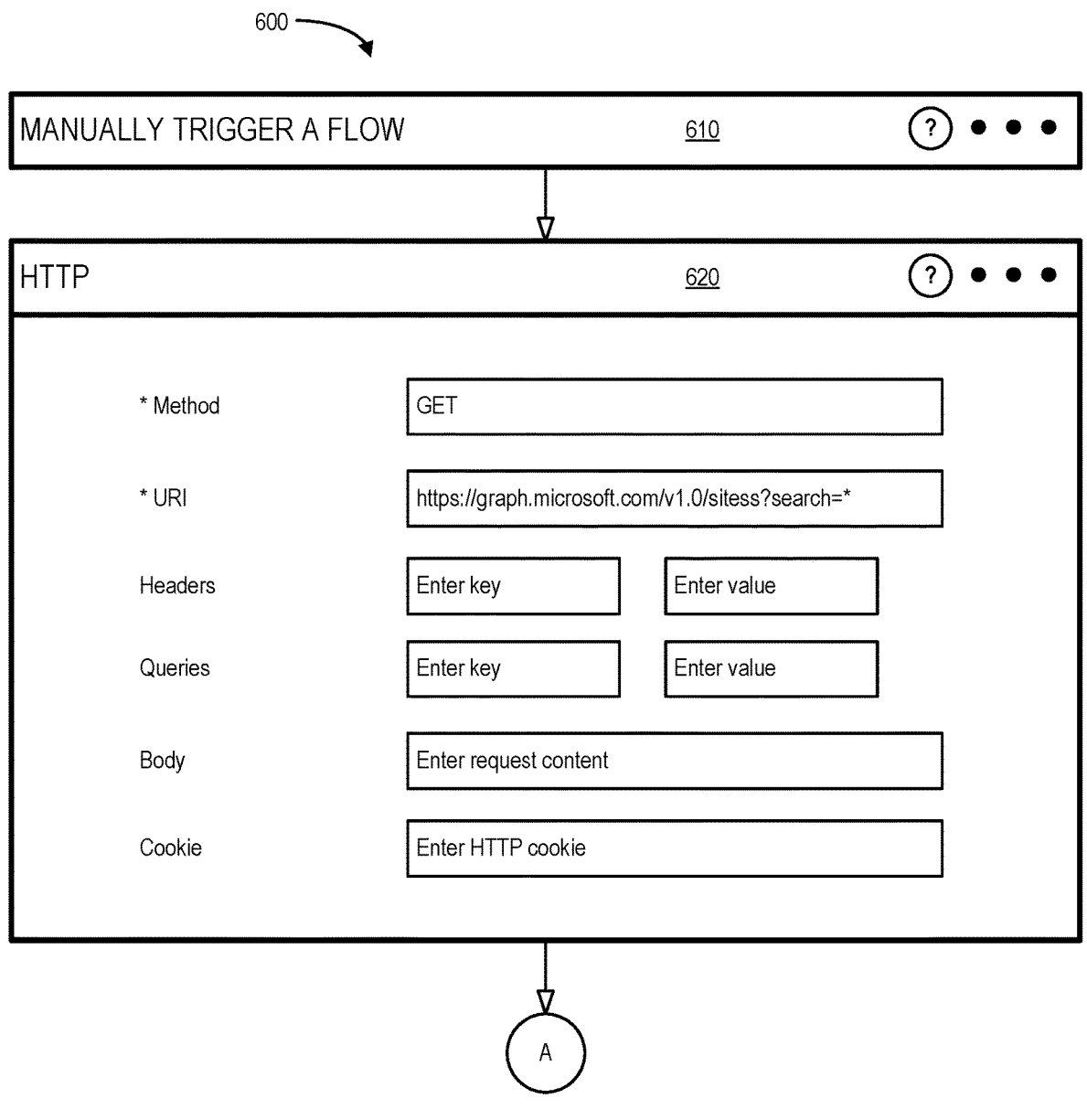
FIGS. 6 through 8 are business flow automation displays according to some embodiments.
Figure 7:
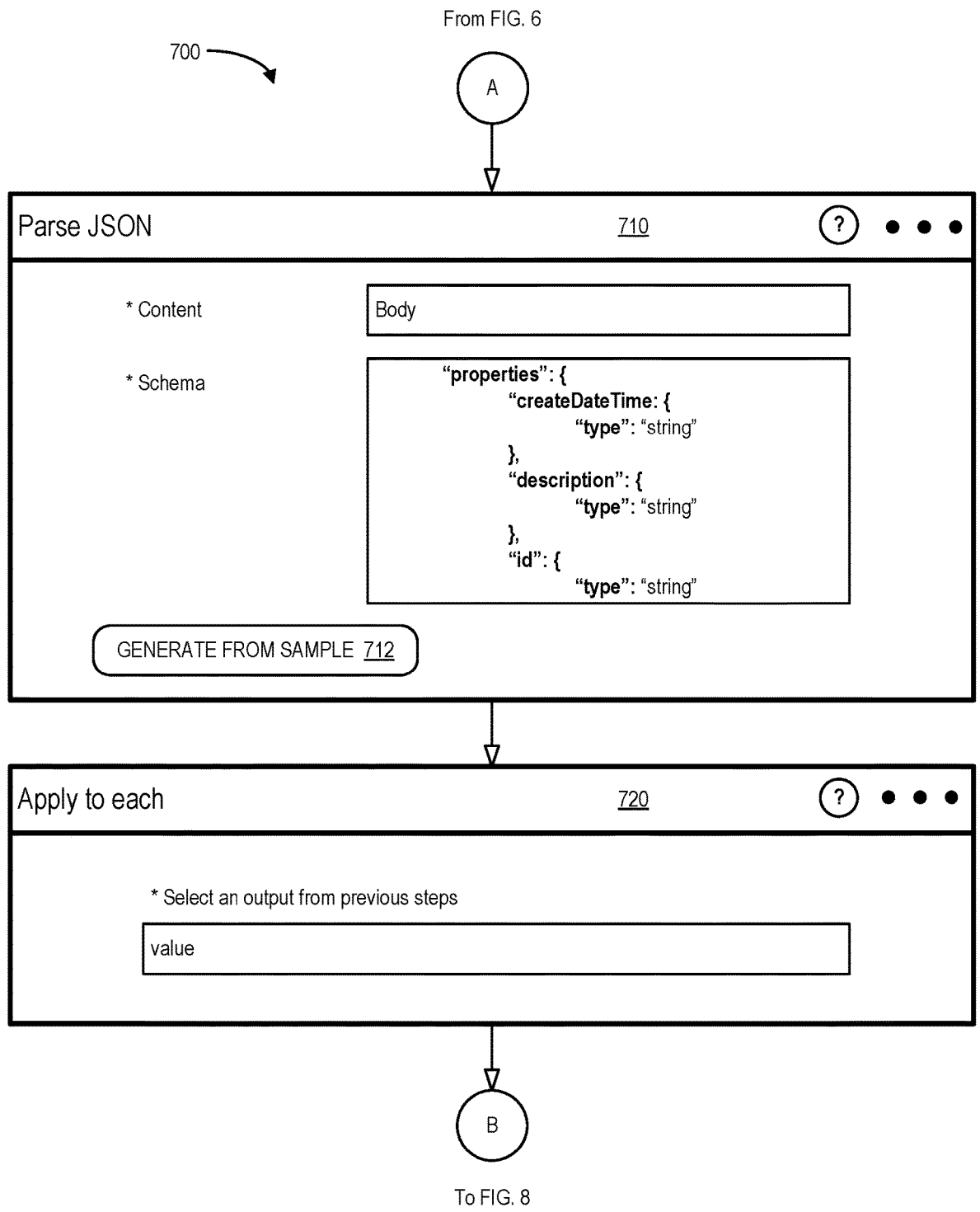
Figure 8:
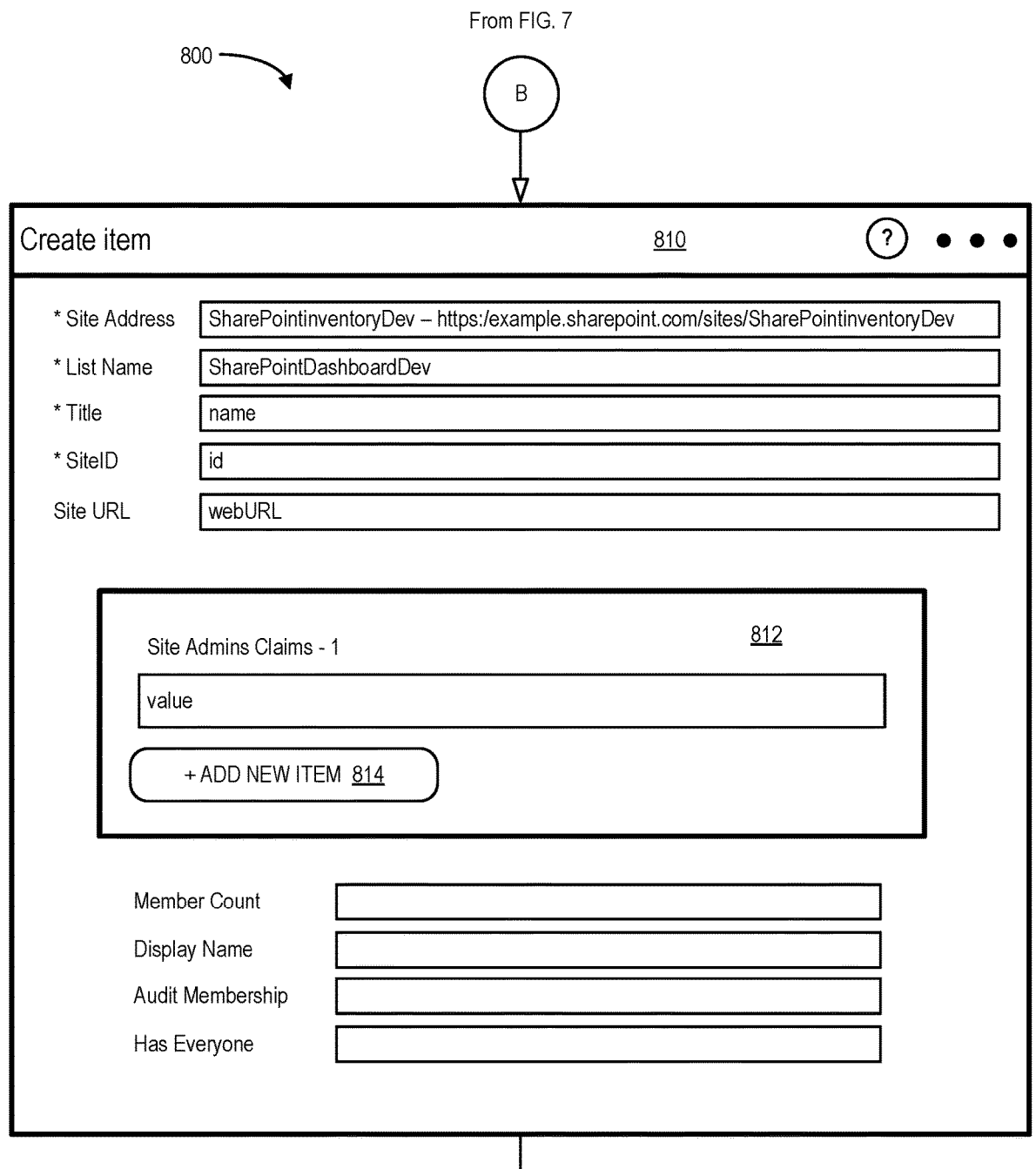

FIGS. 6 through 8 are business flow automation displays according to some embodiments. As shown 600 in FIG. 6, the system may manually trigger a flow 610 and then determine HTTP information 620 (e.g., method, URI, headers, queries, etc.). As shown 700 in FIG. 7, the system may then parse JavaScript Object Notation ("JSON") 710 information (e.g., to determine content and schema and let an operator generate from sample 712) and apply to each 720. As shown 800 in FIG. 8, system may then let a user create an item 810 (e.g., site address, list name, title, site identifier, URL, etc.).

Figure 9:
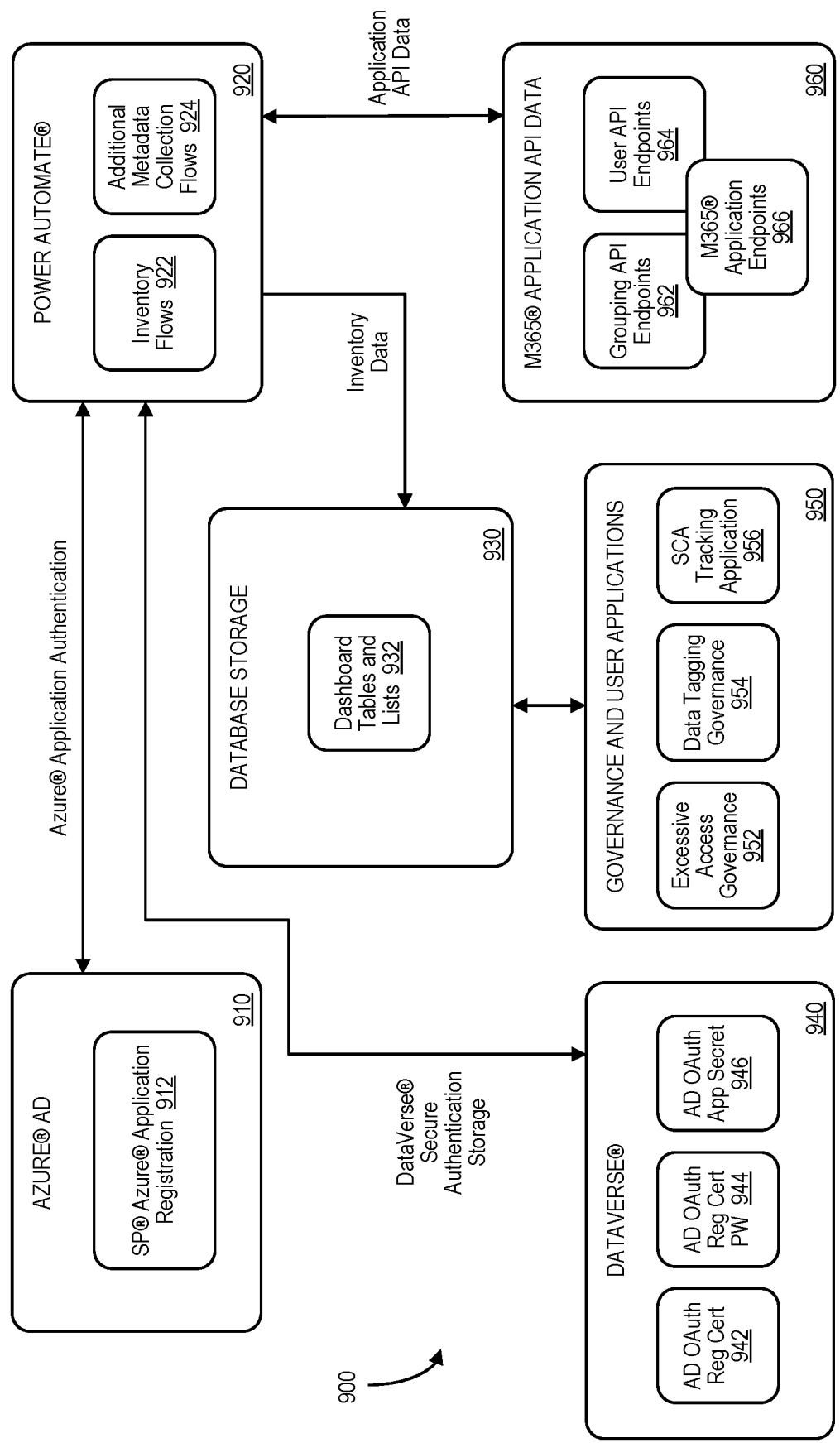
FIG. 9 is another example of an enterprise governance inventory and automation tool according to some embodiments.

Although some embodiments have been described in connection with a SHAREPOINT® Online inventory, note that embodiments may be associated with other types of information (e.g., in connection with MICROSOFT™ YAMMER® or TEAMS®). For example, FIG. 9 is another example of an enterprise governance inventory and automation tool or system 900 according to some embodiments. As before, the system 900 includes a MICROSOFT™ AZURE® Active Directory 910 that may authenticate and authorize enterprise users and computers in a network. The AZURE® Active Directory 910 may, according to some embodiments, provide single sign-on, multifactor authentication, and/or conditional access that may help guard against cybersecurity attacks. In some embodiments, the AZURE® Active Directory 910 further implements SHAREPOINT® AZURE® application registration 912.

The system 900 may further include MICROSOFT™ POWER AUTOMATE® 920 to implement business workflow products and provide application authentication information to the AZURE® Active Directory 910. POWER AUTOMATE® 920 may comprise a toolkit for implementing business workflow products such as inventory flows 922 and/or additional metadata collection flows 924 (e.g., to collect information associated with YAMMER® or TEAMS®).

The database storage 930 may provide document management and storage of dashboard tables and lists 932 (and could be implemented via SHAREPOINT® ONLINE, an SQL database, a DATAVERSE® solution, etc.). MICROSOFT™ DATAVERSE® 940 is a cloud-based storage and data management engine that handles an Active Directory Open Authorization ("OAuth") registration certificate 942. Moreover, in some embodiments the DATAVERSE® 940 further handles an Active Directory OAuth registration certificate password 944 and/or an Active Directory OAuth registration certificate secret 946. Note that the DATAVERSE® may also exchange secure authentication storage data with POWER AUTOMATE® 920.

According to some embodiments, a computer processor of at least one governance or user application 950 to handle excessive access governance 952, data tagging governance 954, a SCA tracking application 956, etc. MICROSOFT™ M365® application API data 960 may implement group API endpoints 962, user API endpoints 964, M365® application endpoints, etc.

Figure 10:
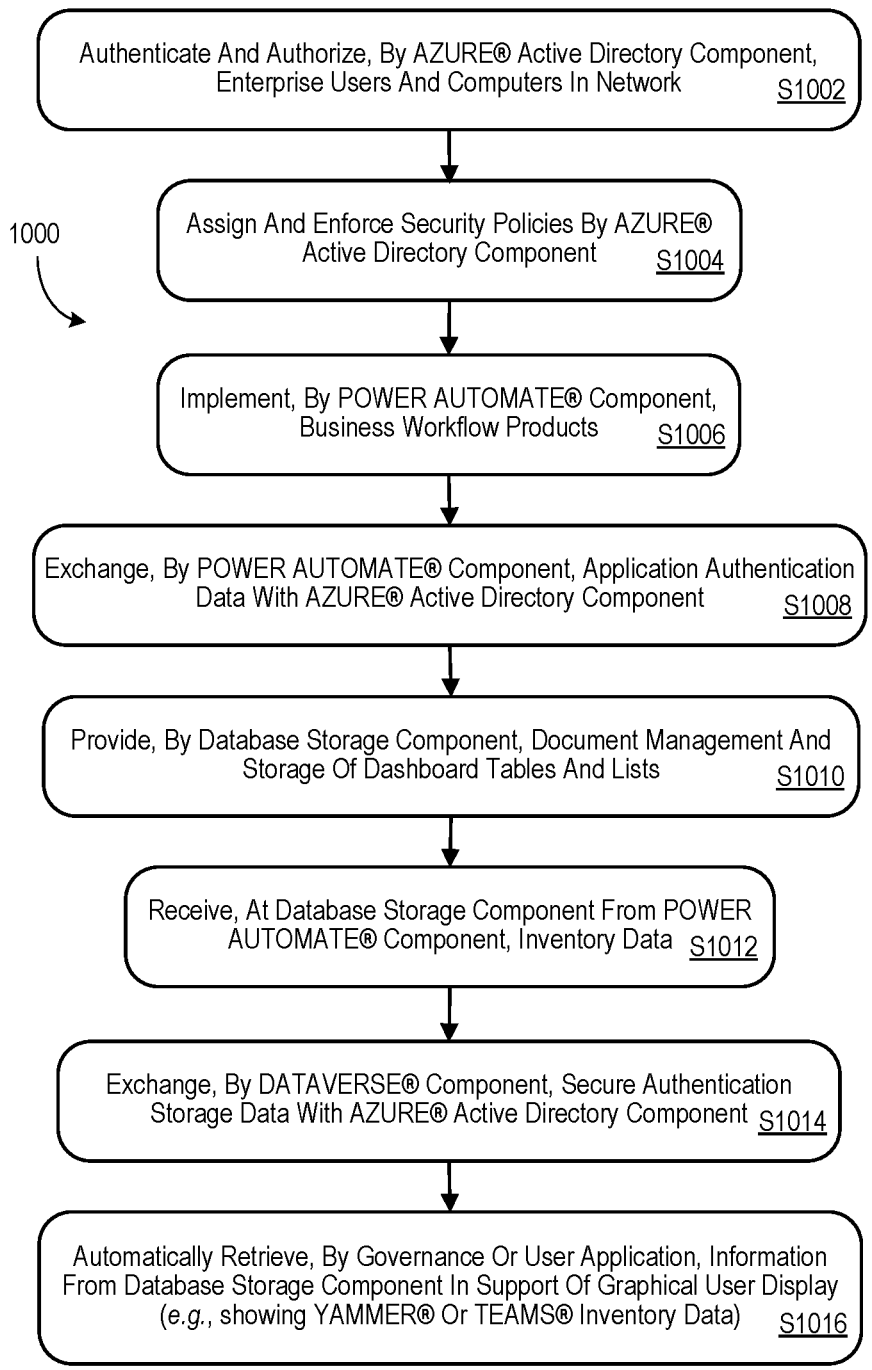
FIG. 10 illustrates another example of an enterprise governance inventory and automation method in accordance with some embodiments of the present invention.

FIG. 10 illustrates another example of an enterprise governance inventory and automation method 1000 in accordance with some embodiments of the present invention. At S1002, AZURE® Active directory component may authenticate and authorize enterprise users and computers in a network. At S1004, the AZURE® Active Directory component may assign and enforce security policies. At S1006, a POWER AUTOMATE® component may implement business workflow products (e.g., inventory flows, additional metadata collection flows, etc.).

At S1008, the POWER AUTOMATE® component may exchange AZURE® authentication data with the AZURE® Active Directory component. At S1010, a database storage component may provide document management and storage of dashboard tables and lists. At S1012, the database storage component may receive inventory data from the POWER AUTOMATE® component. At S1014, a DATAVERSE® engine may exchange DATAVERSE® secure authentication storage data with the POWER AUTOMATE® component. At S1016, a computer processor of at least one governance or user application may automatically retrieve information from the database storage component in support of a graphical user display (e.g., showing YAMMER® or TEAMS® inventory data) via a distributed communication network.

Figure 11:
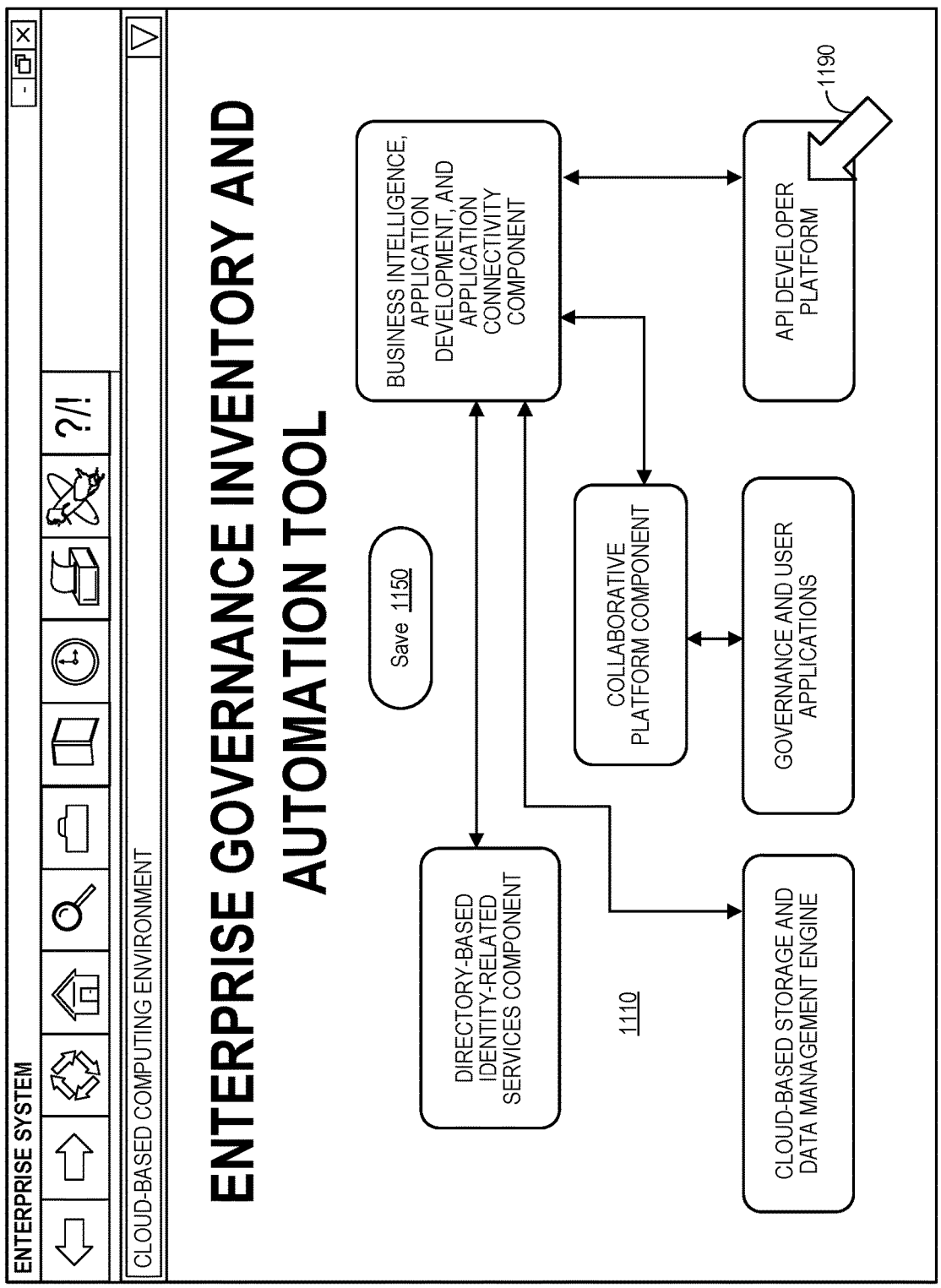
FIG. 11 is an enterprise governance inventory and automation tool administrator or operator display according to some embodiments.

The configuration of a system or tool in accordance with embodiments described herein may be presented on a Graphical User Interface ("GUI"). For example, FIG. 11 is a collaboration system display 1100 including graphical representations 1110 of elements of an enterprise governance inventory and automation tool. Moreover, selection of an element, such as a collaborative platform component or API developer platform (e.g., via touchscreen or computer mouse pointer 1190) may display configuration information about that element and/or let an operator or administrator adjust the configuration (e.g., to modify inventory information). The display 1100 may further let the operator or administrator select a "Save" icon 1150 to cause the system or platform to save changes, apply reconfigurations, etc.

Figure 12:
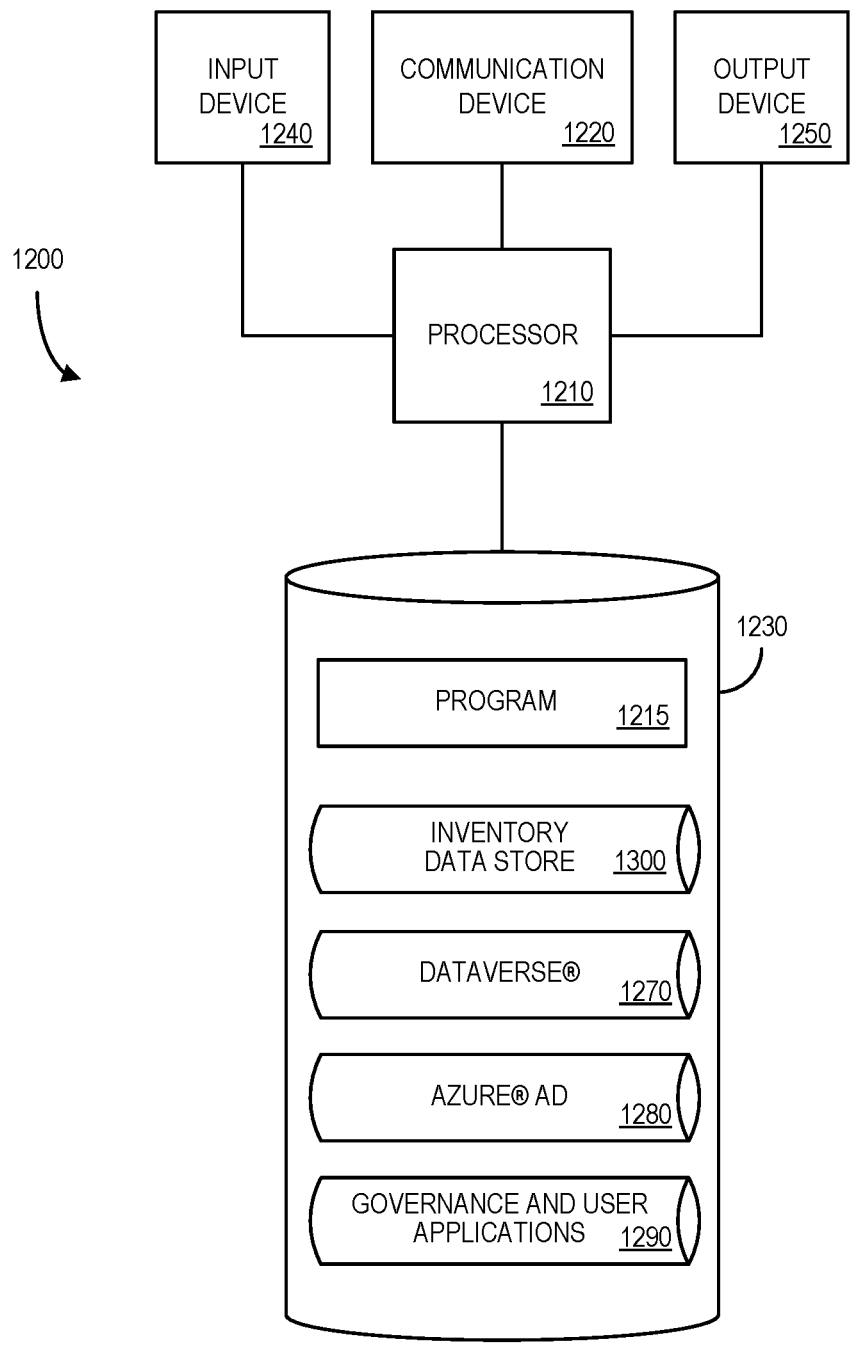
FIG. 12 is a block diagram of an apparatus in accordance with some embodiments of the present invention.

The embodiments described herein may be implemented using any number of different hardware configurations. For example, FIG. 12 illustrates an apparatus 1200 that may be, for example, associated with the systems and architectures 100, 400, 900 described with respect to FIGS. 1, 4, and 9, respectively. The apparatus 1200 comprises a processor 1210, such as one or more commercially available Central Processing Units ("CPUs") in the form of one-chip microprocessors, coupled to a communication device 1220 configured to communicate via a communication network (not shown in FIG. 12). The communication device 1220 may be used to communicate, for example, with one or more remote cloud-based environments, administrator computers, and/or communication devices (e.g., PCs and smartphones). Note that communications exchanged via the communication device 1220 may utilize security features, such as those between a public internet user and an internal network of an insurance company and/or an enterprise. The security features might be associated with, for example, web servers, firewalls, and/or PCI infrastructure. The apparatus 1200 further includes an input device 1240 (e.g., a mouse and/or keyboard to enter information about data sources, mappings, third-parties, etc.) and an output device 1250 (e.g., to output reports regarding inventory, recommended changes, alerts, etc.).

The processor 1210 also communicates with a storage device 1230. The storage device 1230 may comprise any appropriate information storage device, including combinations of magnetic storage devices (e.g., a hard disk drive), optical storage devices, mobile telephones, and/or semiconductor memory devices. The storage device 1230 stores a program 1215 and/or enterprise governance inventory and automation tool or application for controlling the processor 1210. The processor 1210 performs instructions of the program 1215, and thereby operates in accordance with any of the embodiments described herein.

The program 1215 may be stored in a compressed, uncompiled and/or encrypted format. The program 1215 may furthermore include other program elements, such as an operating system, a database management system, and/or device drivers used by the processor 1210 to interface with peripheral devices.

As used herein, information may be "received" by or "transmitted" to, for example: (i) the apparatus 1200 from another device; or (ii) a software application or module within the apparatus 1200 from another software application, module, or any other source.

In some embodiments (such as shown in FIG. 12), the storage device 1230 further stores an inventory data store 1300, DATAVERSE® information 1270 (e.g., associated with OAuth), AZURE® Active Directory information 1280 (e.g., associated with application registration), and governance and user applications 1290 (e.g., associated with excessive access, data tagging, administrator tracking, etc.). An example of database that might be used in connection with the apparatus 1200 will now be described in detail with respect to FIG. 13. Note that the database described herein is only an example, and additional and/or different information may be stored therein. Moreover, various databases might be split or combined in accordance with any of the embodiments described herein. For example, the governance and user applications 1290 and inventory data store 1300 might be combined and/or linked to each other within the program 1215.

Figure 13:
FIG. 13 is a portion of an inventory data store according to some embodiments.

Referring to FIG. 13, a table is shown that represents the inventory data store 1300 that may be stored at the apparatus 1200 according to some embodiments. The table may include, for example, entries associated with sites operated by an enterprise. The table may also define fields 1302, 1304, 1306, 1308, 1310 for each of the entries. The fields 1302, 1304, 1306, 1308, 1310 may, according to some embodiments, specify: an inventory identifier 1302, a site URL 1304, a site title 1306, a member count 1308, and site administrators 1310. The inventory data store 1300 may be created and updated, for example, based on information electrically received from various data sources (e.g., including when sites are added or deleted, member access is adjusted, etc.) that may be associated with an insurer or other enterprise.

The inventory identifier 1302 may be, for example, an alphanumeric code that identifies a particular inventory list that was automatically created for an enterprise. The site URL 1304 may indicate where an application site is located and the site title 1306 may describe the site. The member count 1308 may indicate how many users have access to the site in the inventory (e.g., to be used to identify potential excess access. The site administrators 1310 might indicate who owns or control the site. The information in the inventory data store 1300 might be used, for example, to support the generation of a display 300 such as the one illustrated in FIG. 3.

Thus, embodiments may provide an improved and computerized way to accurately and/or automatically facilitate enterprise governance inventory and automation processes via a family of client software, server software, and services in a way that provides fast and useful metadata. Moreover, embodiments may let the system meet security, interoperability, and/or extensibility requirements as needed. Embodiments may incorporate an original security design and an original API integration design as components of an original overall solution.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to specific types of enterprises, embodiments may instead be associated with other types of enterprises in additional to and/or instead of those described herein (e.g., banks or other financial institutions). Similarly, although certain types of sites and parameters were described in connection some embodiments herein, any other types of sites (e.g., associated with sales teams, engineers, insurance claim handlers, underwriters, telephone call center customer service representatives, etc.) and parameters might be used instead. Moreover, embodiments may be implemented using family of client software, server software, and services other than TEAMS® (e.g., SALESFORCE.COM® or SLACK®). That is, embodiments described herein may be used by any type of team or user to collaborate via an enterprise tools and any type of family of client software, server software, and services.

Figure 14:
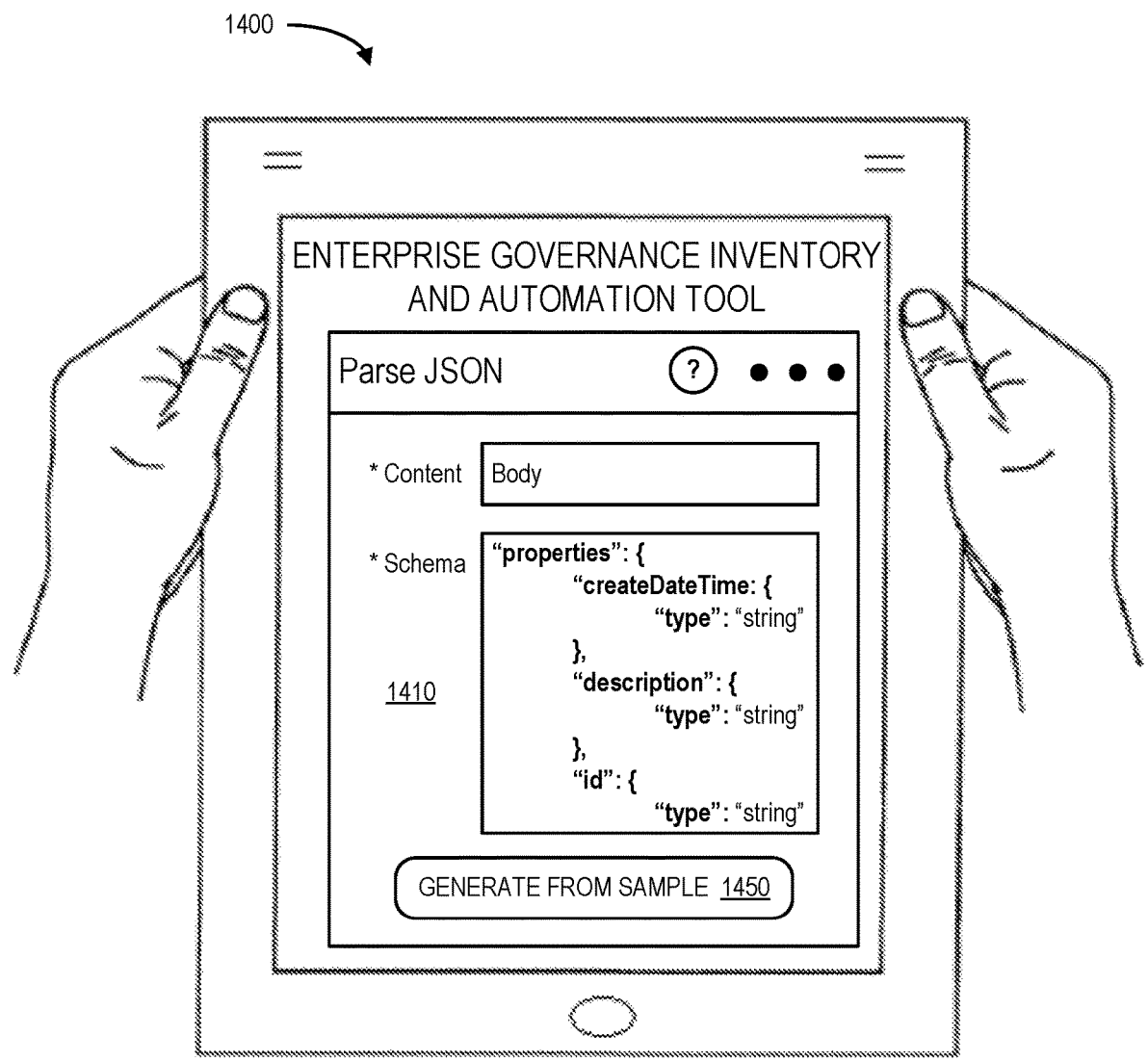
FIG. 14 illustrates a tablet computer providing an enterprise governance inventory and automation tool display in accordance with some embodiments.

Note that the displays and devices illustrated herein are only provided as examples, and embodiments may be associated with any other types of user interfaces. For example, FIG. 14 illustrates a handheld tablet computer 1400 with an enterprise governance inventory and automation tool display 1410 according to some embodiments. The enterprise governance inventory and automation tool display 1410 shows elements of an actual automation architecture that might include selectable data that can be modified by a user of the tablet computer 1400 (e.g., via an "Generate From Sample" icon 1450) to view updated enterprise governance inventory and automation tool data associated with an enterprise (e.g., including, in some embodiments, available templates and mapping information).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system associated with an enterprise, comprising:
   (i) a directory-based identity-related services component to: authenticate and authorize enterprise users and computers in a network, and assign and enforce security policies;
   (ii) a business intelligence, application development, and application connectivity component to: implement business workflow products, and exchange application authentication data with the directory-based identity-related services component;
   (iii) a database storage component to: provide document management and storage of dashboard tables and lists associated with inventory data received from the business intelligence, application development, and application connectivity component;
   (iv) a cloud-based storage and data management engine to exchange secure authentication storage data with the business intelligence, application development, and application connectivity component; and
   (v) at least one governance or user application, including:
      a computer processor,
      a computer memory, coupled to the computer processor, storing instructions that, when executed by the computer processor cause an enterprise platform to:
         automatically determine enterprise site inventory information representing the sites operated by the enterprise,
         responsive to the determined enterprise site inventory information,
         automatically determine enterprise site membership information, and
         exchange the dashboard tables and lists with the dashboard storage component,
         wherein the exchange is in response to receipt of the enterprise site inventory information and secure authentication storage data; and
      a communication port to facilitate a transmission of data with remote user devices in support of a graphical user display, including the enterprise site inventory and membership information, via a distributed communication network.

2. The system of claim 1, further comprising:
   (vi) an API developer platform to: connect multiple services and devices, and exchange API data with the business intelligence, application development, and application connectivity component.

3. The system of claim 2, wherein the directory-based identity-related services component comprises an AZURE® Active Directory component.

4. The system of claim 3, wherein the AZURE® Active Directory component implements SHAREPOINT® AZURE® application registration.

5. The system of claim 2, wherein the business intelligence, application development, and application connectivity component comprises a POWER AUTOMATE® component.

6. The system of claim 5, wherein the POWER AUTOMATE® component implements: a SHAREPOINT® site inventory flow, and a SHAREPOINT® site membership flow.

7. The system of claim 2, wherein the database storage component comprises at least one of: a SHAREPOINT® Online component, a Structured Query Language ("SQL") database, and a DATAVERSE® storage solution.

8. The system of claim 7, wherein the SHAREPOINT® Online component implements: a SHAREPOINT® Online dashboard list, and a SHAREPOINT® API endpoint.

9. The system of claim 2, wherein the cloud-based storage and data management engine comprises a DATAVERSE® engine.

10. The system of claim 9, wherein the DATAVERSE® engine implements: an Active Directory Open Authorization ("OAuth") registration certificate, an Active Directory OAuth registration certificate password, and an Active Directory OAuth registration certificate secret.

11. The system of claim 2, wherein the governance or user application implements at least one of: excessive access governance, data tagging governance, and a site collection administrators tracking application.

12. The system of claim 2, wherein the API developer platform comprises a GRAPH® platform.

13. The system of claim 12, wherein the GRAPH® platform implements: a group API endpoint, and a user API endpoint.

14. The system of claim 1, wherein the dashboard tables and lists are associated with at least one of: enterprise SHAREPOINT® inventory, enterprise YAMMER® inventory, and enterprise TEAMS® inventory.

15. A computerized method associated with an enterprise, comprising:
   authenticating and authorizing, by a directory-based identity-related services component, enterprise users and computers in a network;
   assigning and enforcing security policies by the directory-based identity-related services component;
   implementing, by a business intelligence, application development, and application connectivity component, business workflow products;
   exchanging, by the business intelligence, application development, and application connectivity component, application authentication data with the directory-based identity-related services component, wherein the exchange is in response to receipt of enterprise site inventory information and secure authentication storage data;
   providing, by a database storage component, document management and storage of dashboard tables and lists associated with inventory data received from the business intelligence, application development, and application connectivity component;
   exchanging, by a cloud-based storage and data management engine, secure authentication storage data with the business intelligence, application development, and application connectivity component;

automatically determining, by a computer processor of at least one governance or user application, enterprise site inventory information representing the sites operated by the enterprise;

responsive to the determined enterprise site inventory information, automatically determining, by the computer processor of at least one governance or user application, enterprise site membership information; and exchanging the dashboard tables and lists with the dashboard storage component via a communication port in support of a graphical user display, including the enterprise site inventory and membership information, via a distributed communication network.

16. The method of claim 15, further comprising:

connecting, by an API developer platform, multiple services and devices; and exchanging, by the API developer platform, API data with the business intelligence, application development, and application connectivity component.

17. The method of claim 16, wherein the directory-based identity-related services component comprises an AZURE® Active Directory component that implements SHAREPOINT® AZURE® application registration.

18. The method of claim 17, wherein the business intelligence, application development, and application connectivity component comprises a POWER AUTOMATE® component that implements: a SHAREPOINT® site inventory flow, and a SHAREPOINT® site membership flow.

19. The method of claim 18, wherein the database storage component comprises at least one of: a SHAREPOINT® Online component that implements a SHAREPOINT® Online dashboard list and a SHAREPOINT® API endpoint, a Structured Query Language ("SQL") database, and a DATAVERSE® storage solution.

20. A non-transitory, computer-readable medium storing instructions, that, when executed by a processor, cause the processor to perform a method associated with an enterprise, the method comprising:

authenticating and authorizing, by a directory-based identity-related services component, enterprise users and computers in a network;

assigning and enforcing security policies by the directory-based identity-related services component;

implementing, by a business intelligence, application development, and application connectivity component, business workflow products;

exchanging, by the business intelligence, application development, and application connectivity component, application authentication data with the directory-based identity-related services component;

providing, by a collaborative platform component, document management and storage of dashboard list data;

exchanging, by the collaborative platform component, data with the business intelligence, application development, and application connectivity component along with Application Programming Interface ("API") data;

exchanging, by a cloud-based storage and data management engine, secure authentication storage data with the business intelligence, application development, and application connectivity component, wherein the exchange is in response to receipt of enterprise site inventory information and secure authentication storage data;

automatically determining, by a computer processor of at least one governance or user application, enterprise site inventory information representing the sites operated by the enterprise;

responsive to the determined enterprise site inventory information, automatically determining, by the computer processor of at least one governance or user application, enterprise site membership information;

transmitting the dashboard list data to the collaborative platform component via a communication port in support of a graphical user display, including the enterprise site inventory and membership information, via a distributed communication network;

connecting, by an API developer platform, multiple services and devices; and exchanging, by the API developer platform, API data with the business intelligence, application development, and application connectivity component.

21. The medium of claim 20, wherein the cloud-based storage and data management engine comprises a DATAVERSE® engine that implements: an Active Directory Open Authorization ("OAuth") registration certificate, an Active Directory OAuth registration certificate password, and an Active Directory OAuth registration certificate secret.

22. The medium of claim 21, wherein the governance or user application implements at least one of: excessive access governance, data tagging governance, and a site collection administrators tracking application.

23. The system of claim 1, wherein the assigned and enforced security policies are implemented by determining whether a user is a system administrator or a "normal" user.

* * * * *